(12) United States Patent
Ota et al.

(10) Patent No.: US 7,207,185 B2
(45) Date of Patent: Apr. 24, 2007

(54) VEHICLE AIR CONDITIONING APPARATUS

(75) Inventors: Masaki Ota, Kariya (JP); Tomoji Tarutani, Kariya (JP); Hisato Kawamura, Kariya (JP); Yoshinori Inoue, Kariya (JP); Masahiro Kawaguchi, Kariya (JP)

(73) Assignee: General Electric Company, Schenectady, NY (US)

( * ) Notice: Subject to any disclaimer, the term of this patent is extended or adjusted under 35 U.S.C. 154(b) by 674 days.

(21) Appl. No.: 10/737,941

(22) Filed: Dec. 16, 2003

(65) Prior Publication Data

US 2004/0148947 A1 Aug. 5, 2004

(30) Foreign Application Priority Data

Dec. 18, 2002 (JP) ............................ P2002-365957

(51) Int. Cl.
*F25B 43/02* (2006.01)

(52) U.S. Cl. ........................... 62/193; 62/469; 417/372

(58) Field of Classification Search ................ 62/84, 62/193, 468–469; 417/372
See application file for complete search history.

(56) References Cited

U.S. PATENT DOCUMENTS 6,015,269 A 1/2000 Ota et al. ................ 417/222.2
6,434,956 B1 8/2002 Ota et al. ...................... 62/133
6,604,912 B2 8/2003 Suitou et al. ............ 417/222.2

FOREIGN PATENT DOCUMENTS

| EP | 1 074 800 A2 | 2/2001 |
| EP | 1 228 910 A2 | 8/2002 |
| JP | 2001-107854 | 4/2001 |
| WO | 01/36823 | 5/2001 |

*Primary Examiner*—William E. Tapolcai
(74) *Attorney, Agent, or Firm*—Cantor Colburn LLP

(57) ABSTRACT

A vehicle air conditioning apparatus includes a refrigerant circulation circuit. The vehicle air conditioning apparatus has a variable displacement type compressor, a first pressure monitoring point, a second pressure monitoring point and an oil separator in the refrigerant circulation circuit. Also, the vehicle air conditioning apparatus has a control valve in the compressor. The compressor compresses refrigerant gas. Displacement of the compressor is variable. The refrigerant gas includes oil. The second pressure monitoring point is located more downstream than the first pressure monitoring point. The control valve controls the displacement based on differential pressure between the first and second pressure monitoring points. The oil separator is located between the first and second pressure monitoring points in order to separate the oil from the compressed refrigerant gas, thereby the oil separator serves as means for manifesting the differential pressure.

7 Claims, 3 Drawing Sheets

VEHICLE AIR CONDITIONING APPARATUS

BACKGROUND OF THE INVENTION

The present invention relates to a vehicle air conditioning apparatus including a variable displacement type compressor, an oil separator and a control valve that controls displacement of the compressor based on differential pressure between two pressure monitoring points set in a refrigerant circulation circuit.

Japanese Unexamined Patent Publication No. 2001-107854 discloses this type of air conditioning apparatus.

Specifically, the air conditioning apparatus includes a variable displacement type compressor (hereinafter referred to a compressor) and a control valve that controls displacement of the compressor based on differential pressure between two pressure monitoring points set in a refrigerant circulation circuit. Also, a fixed throttle is placed between the two pressure monitoring points.

The control valve includes a pressure sensing member that is displaced in accordance with variation of the differential pressure between the two pressure monitoring points. Thereby, a valve body of the control valve is operated so as to cancel the variation of the differential pressure. Thus, displacement of the compressor is controlled. When refrigerant gas passes through the fixed throttle, pressure loss of the refrigerant gas is caused by the fixed throttle. Thus, the fixed throttle manifests the differential pressure between the two pressure monitoring points. That is, the fixed throttle serves as means for manifesting the differential pressure. Thereby, the control valve is easily controlled in accordance with the differential pressure. Thus, displacement controllability of the control valve is improved.

If an oil separator is provided with the prior art air conditioning apparatus, pressure loss of the refrigerant gas is caused not only by the oil separator but also by the fixed throttle. The oil separator conventionally separates oil contained in the refrigerant gas from the refrigerant gas and returns to the compressor. Thereby, the internal parts of the compressor are sufficiently lubricated. In addition, the oil that adheres to the inner wall of a heat exchanger constituting the refrigerant circulation circuit is reduced, and efficiency for exchanging heat is raised. Thereby, volumetric efficiency of the compressor is improved. The heat exchanger includes an evaporator and a condenser. However, deterioration of the volumetric efficiency of the compressor caused by the pressure loss of the refrigerant gas exceeds effect of the improvement of the volumetric efficiency caused by the oil separator. Consequently, the volumetric efficiency of the compressor as a whole deteriorates.

SUMMARY OF THE INVENTION

The present invention is directed to a vehicle air conditioning apparatus in which an oil separator is placed between two pressure monitoring points and in which the oil separator manifests differential pressure therebetween. Thereby, even if a fixed throttle is no longer used, displacement controllability of a control valve is sufficiently maintained and volumetric efficiency of a compressor is improved.

The present invention has the following feature. A vehicle air conditioning apparatus includes a refrigerant circulation circuit. The vehicle air conditioning apparatus has a variable displacement type compressor, a first pressure monitoring point, a second pressure monitoring point and an oil separator in the refrigerant circulation circuit. Also, the vehicle air conditioning apparatus has a control valve in the compressor. The compressor compresses refrigerant gas. Displacement of the compressor is variable. The refrigerant gas includes oil. The second pressure monitoring point is located more downstream than the first pressure monitoring point. The control valve controls the displacement based on differential pressure between the first and second pressure monitoring points. The oil separator is located between the first and second pressure monitoring points in order to separate the oil from the compressed refrigerant gas, thereby the oil separator serves as means for manifesting the differential pressure.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
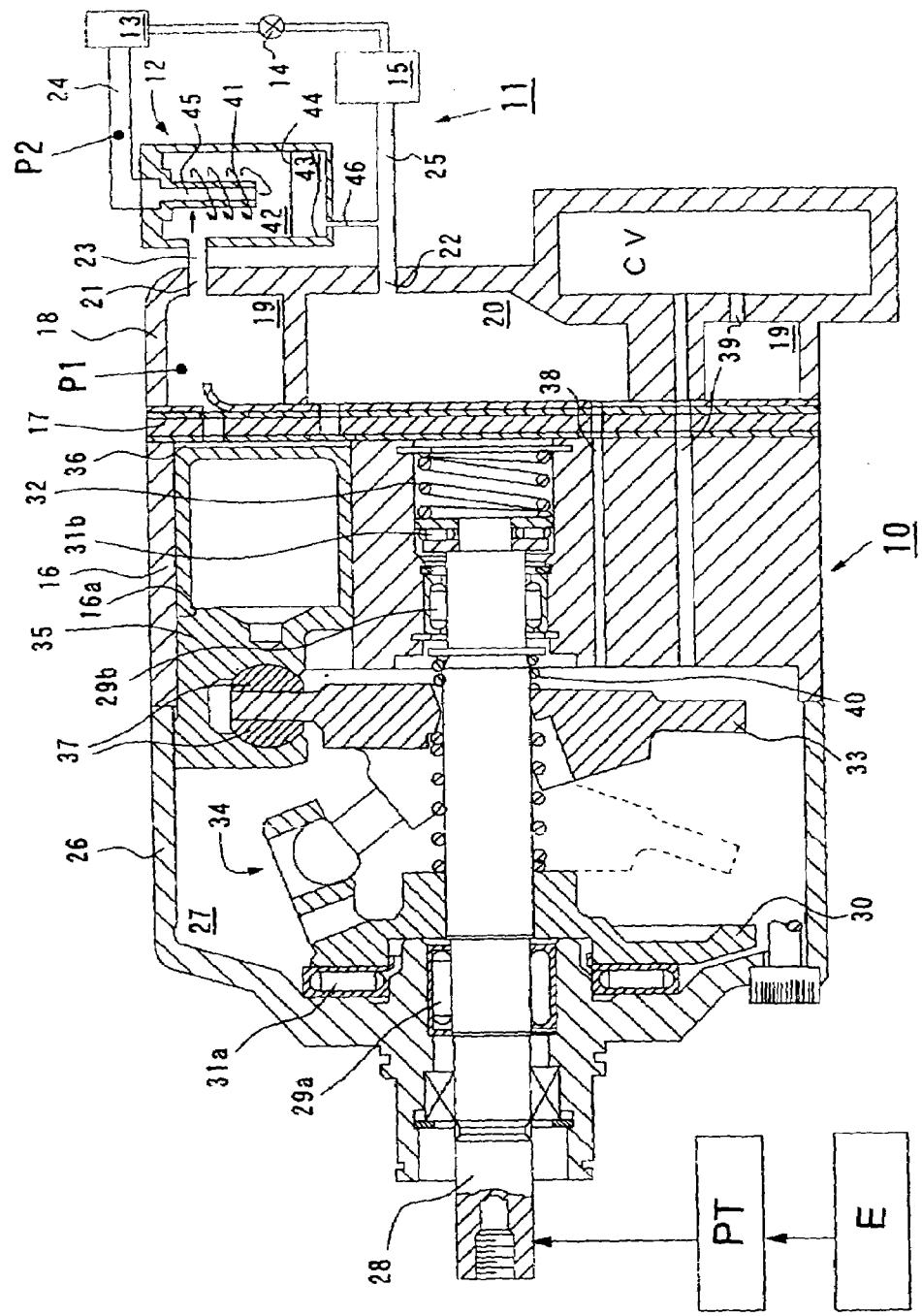
FIG. 1 is a longitudinal-sectional view illustrating the variable displacement type compressor according to a first preferred embodiment of the present invention.

A vehicle air conditioning apparatus according to a first preferred embodiment of the present invention will now be described with reference to FIGS. 1 and 2. In FIG. 1, a left side of drawing is a front side and a right side thereof is a rear side. Also, in FIG. 2, an upside of the drawing is an upside and a downside thereof is a downside.

First, a refrigerant circulation circuit of the vehicle air conditioning apparatus is structurally described with reference to FIG. 1. The refrigerant circulation circuit includes a variable displacement type compressor 10 (hereinafter referred to a compressor 10) and an external refrigerant circuit 11. The external refrigerant circuit 11 includes an oil separator 12, a condenser 13, an expansion valve 14 and an evaporator 15. The oil separator 12 is connected to the condenser 13 by a piping. Also, the condenser 13 is connected to the expansion valve 14 by a piping. Also, the expansion valve 14 is connected to the evaporator 15 by a piping.

Still referring to FIG. 1, in the compressor 10, the front end of a rear housing 18 is joined to the rear end of a cylinder block 16 through a valve plate assembly 17. In the rear housing 18, a discharge chamber 19, a suction chamber 20, a discharge passage 21 and a suction passage 22 are formed. The discharge passage 21 is connected to the discharge chamber 19. The suction passage 22 is connected to the suction chamber 20. The discharge passage 21 is connected to a refrigerant gas introducing portion 23 of the oil separator 12. The refrigerant gas introducing portion 23 introduces refrigerant gas into the oil separator 12. The oil separator 12 is connected to the condenser 13 by a discharge piping 24. Also, the suction passage 22 is connected to the evaporator 15 by a suction piping 25.

Now, the structure and the operation of the compressor 10 will be described. The rear end of a front housing 26 is joined to the front end of the cylinder block 16 to define a crank chamber 27 that serves as a control chamber.

Each of the cylinder block 16 and the front housing 26 has a shaft hole in the middle thereof. A drive shaft 28 is supported by a radial bearing 29a in the front housing 26 and by a radial bearing 29b in the cylinder block 16 for rotation so as to extend through the shaft holes of the cylinder block 16 and the front housing 26. The drive shaft 28 is connected to an engine E through a power transmission mechanism PT for operation and receives power from the engine E for rotation. The engine E serves as an external drive source for a vehicle. In the crank chamber 27, a lug plate 30 is fixed to the drive shaft 28 so as to integrally rotate with the drive shaft 28. A thrust bearing 31a is interposed between the lug plate 30 and the inner surface of the front housing 26 so as to contact with the lug plate 30 and the inner surface of the front housing 26. In the shaft hole of the cylinder block 16, a thrust bearing 31b and a spring 32 are interposed between the rear end of the drive shaft 28 and the valve plate assembly 17. The thrust bearings 31a and 31b, and the spring 32 restrict movement in a direction of a rotary axis of the drive shaft 28.

A swash plate 33 that serves as a cam plate is supported by the drive shaft 28 so as to slide along the direction of the rotary axis of the drive shaft 28 and to incline relative to a perpendicular plane to the rotary axis of the drive shaft 28. A hinge mechanism 34 is interposed between the lug plate 30 and the swash plate 33. Therefore, the swash plate 33 is synchronously rotated with the lug plate 30 and the drive shaft 28 through the hinge mechanism 34 while being inclinable relative to the perpendicular plane to the rotary axis of the drive shaft 28.

A plurality of cylinder bores 16a is formed through the cylinder block 16. A piston 35 is accommodated in each cylinder bore 16a for reciprocation. In each cylinder bore 16a, a compression chamber 36 is defined between the corresponding piston 35 and the valve plate assembly 17. The volume of the compression chamber 36 is varied in accordance with the reciprocation of the corresponding piston 35. Each piston 35 is engaged with the periphery of the swash plate 33 through a pair of shoes 37. Therefore, the rotation of the drive shaft 28 is converted to the reciprocation of the piston 35 through the swash plate 33 and the shoes 37. While the piston 35 is reciprocated in the cylinder bore 16a, the refrigerant gas in the suction chamber 20 is drawn into the compression chamber 36 and is compressed in the compression chamber 36 to be discharged to the discharge chamber 19.

A bleed passage 38 is formed in the cylinder block 16 and a supply passage 39 is formed in the cylinder block 16 and the rear housing 18. The bleed passage 38 interconnects the crank chamber 27 with the suction chamber 20, and the supply passage 39 interconnects the discharge chamber 19 with the crank chamber 27. In the rear housing 18, a control valve CV is placed and the supply passage 39 passes through the control valve CV. The control valve CV includes means for detecting differential pressure, means for controlling compressor and means for varying set differential pressure (hereinafter referred to respectively as differential pressure detecting means, compressor controlling means and set differential pressure varying means).

In the crank chamber 27, the refrigerant gas of high-pressure in the discharge chamber 19 is introduced into the crank chamber 27 through the supply passage 39 while the refrigerant gas in the crank chamber 27 is sent outside the crank chamber 27 through the bleed passage 38. Balance between the amount of introduced refrigerant gas and the amount of sent refrigerant gas is controlled by adjusting the opening degree of the control valve CV. Thus, the pressure in the crank chamber 27 is determined. The differential pressure between the pressure in the crank chamber 27 and the pressure in the compression chamber 36 is varied in accordance with variation of the pressure in the crank chamber 27, and an angle of inclination of the swash plate 33 is varied. Consequently, displacement of the compressor 10 is adjusted.

Specifically, when the pressure in the crank chamber 27 is reduced, the angle of inclination of the swash plate 33 increases and the displacement of the compressor 10 also increases. In FIG. 1, the swash plate 33 shown by a dotted line contacts with the lug plate 30, and the increase of the angle of inclination of the swash plate 33 is restricted by the lug plate 30. That is, in this state, the angle of inclination of the swash plate 33, which is shown by the dotted line, is maximized. On the other hand, when the pressure in the crank chamber 27 is increased, the angle of inclination of the swash plate 33 reduces and the displacement of the compressor 10 also reduces. In FIG. 1, the swash plate 33 shown by a solid line contacts with means 40 for restricting minimum angle of inclination, and reduction of the angle of inclination of the swash plate 33 is restricted by the means 40, which is formed around the drive shaft 28. That is, in this state, the angle of inclination of the swash plate 33, which is shown by the solid line, is minimized. In the variation of an amount of the circulation of the refrigerant gas, when the amount of circulation of the refrigerant gas increases, the pressure in the crank chamber 27 increases and the displacement of the compressor 10 reduces. In contrast, when the amount of circulation of the refrigerant gas reduces, the pressure in the crank chamber 27 reduces and the displacement of the compressor 10 increases.

Figure 2:
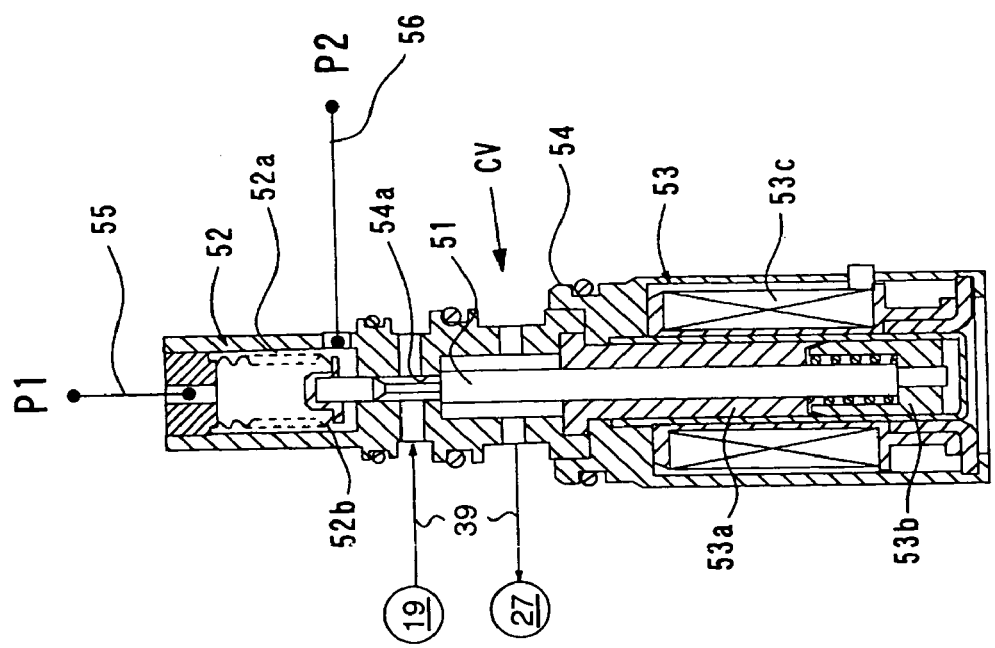
FIG. 2 is an enlarged longitudinal-sectional view illustrating the control valve CV according to the first preferred embodiment of the present invention.

As shown in FIG. 2, the control valve CV includes a valve body 51, a pressure sensing mechanism 52, an electromagnetic actuator 53 and a valve housing 54. The valve body 51, the pressure sensing mechanism 52, the electromagnetic actuator 53 are placed in the valve housing 54. The valve body 51 adjusts the opening degree of the supply passage 39 and serves as the compressor controlling means. The pressure sensing mechanism 52 is connected to the upside of the valve body 51 for operation and serves as the differential pressure detecting means. The electromagnetic actuator 53 is connected to the downside of the valve body 51 for operation and serves as the set differential pressure varying means. In the valve housing 54, a valve hole 54a is formed so as to constitute a part of the supply passage 39. As the valve body 51 moves downward, the opening degree of the valve hole 54a is increased. In contrast, as the valve body 51 moves upward, the opening degree of the valve hole 54a is reduced.

The pressure sensing mechanism 52 includes a pressure sensing chamber 52a and a bellows 52b. The pressure sensing chamber 52a is formed in an upper part of the valve housing 54. The bellows 52b is accommodated in the pressure sensing chamber 52a and serves as a pressure sensing member. In the pressure sensing chamber 52a, the pressure at a first pressure monitoring point P1 is introduced into the internal space of the bellows 52b through a first pressure detecting passage 55. Also, in the pressure sensing chamber 52a, the pressure at a second pressure monitoring point P2 is introduced into the external space of the bellows 52b through a second pressure detecting passage 56. The bellows 52b provides the valve body 51 with downward pressing-force that results from differential pressure ΔP between the first pressure monitoring point P1 and the second pressure monitoring point P2.

The electromagnetic actuator 53 includes a stator core 53a, a movable core 53b and a coil 53c. The valve body 51 is connected to the movable core 53b for operation. In accordance with electric energy supplied to the coil 53c, upward electromagnetic force is generated between the stator core 53a and the movable core 53b. The electromagnetic force is transmitted to the valve body 51 through the movable core 53b.

In the control valve CV, when an electric current is sent to the coil 53c, the upward electromagnetic force, which is generated between the stator core 53a and the movable core 53b, is applied to the valve body 51 through the movable core 53b. Also, the bellows 52b provides the valve body 51 with the downward pressing-force that results from the differential pressure ΔP. Further, downward urging-force is caused by elastic force of the bellows 52b. In accordance with balance between the upward electromagnetic force, the downward pressing-force and the downward urging-force, a position of the valve body 51 is determined. Therefore, as the differential pressure ΔP increases, a range of the upward electromagnetic force is widened when the valve body 51 is positioned. That is, a range of the electric energy supplied to the coil 53c is widely set. Thereby, delicate controllability is achieved.

Now, the oil separator 12 will be described with reference to FIG. 1. In the refrigerant circulation circuit, the first pressure monitoring point P1 is set in the discharge chamber 19 and the second pressure monitoring point P2 is set in the discharge piping 24. Also, the oil separator 12 is placed between the first pressure monitoring point P1 and the second pressure monitoring point P2.

The oil separator 12 includes a cylindrical separator 41, a separation chamber 42, a reservoir 43 and a filter 44. The separator 41 is placed in the separation chamber 42 and separates the oil in the refrigerant gas that is introduced from the discharge passage 21 to the separation chamber 42 through the refrigerant gas introducing portion 23 from the refrigerant gas. The reservoir 43 is juxtaposed with the separation chamber 42. The oil is reserved in the reservoir 43 after foreign matters in the oil are eliminated by the filter 44. The refrigerant gas from which oil is separated is discharged to the discharge piping 24 through a refrigerant gas passage 45 formed in the separator 41. The oil, which is reserved in the reservoir 43, is returned to the suction piping 25 through a hole 46. The oil, which is returned to the suction piping 25, is drawn into the compressor 10. Therefore, the internal parts of the compressor 10 are sufficiently lubricated all the time. Thereby, durability of the compressor 10 is improved.

In addition, when the oil is separated from the refrigerant gas by the oil separator 12, the amount of oil that flows into the condenser 13 and the evaporator 15 is reduced. Thereby, the amount of oil that adheres to the insides of the condenser 13 and the evaporator 15 is also reduced. Each of the condenser 13 and the evaporator 15 serves as a heat exchanger. Therefore, efficiency in heat exchange of the condenser 13 and the evaporator 15 is improved. Consequently, volumetric efficiency of the compressor 10 is improved.

In the oil separator 12, when the oil is separated from the refrigerant gas by the separator 41, the pressure loss of the refrigerant gas manifests the differential pressure ΔP between the first pressure monitoring point P1 and the second pressure monitoring point P2.

In the present embodiment, the following advantageous effects are obtained.

The oil separator 12 is adopted as means for manifesting differential pressure so as to manifest the differential pressure ΔP in place of the prior art fixed throttle. Thereby, even if the fixed throttle is no longer used, controllability of the control valve CV is sufficiently maintained. In addition, the oil separator 12 improves the volumetric efficiency of the compressor 10.

Figure 3:
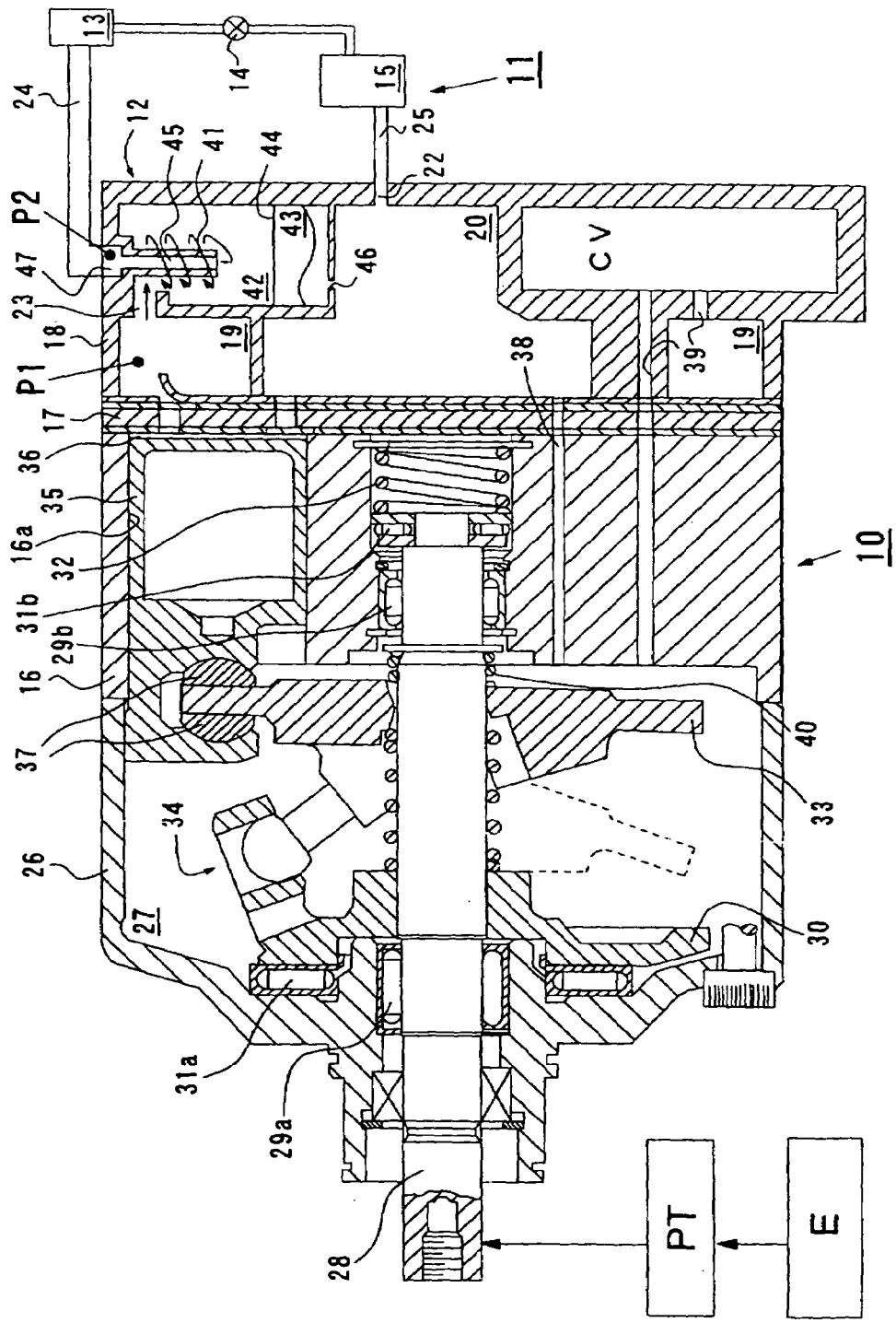
FIG. 3 is a longitudinal-sectional view illustrating the variable displacement type compressor according to a second preferred embodiment of the present invention.

A vehicle air conditioning apparatus according to a second preferred embodiment of the present invention will now be described with reference to FIG. 3. In FIG. 3, a left side of drawing is a front side and a right side thereof is a rear side. In the second embodiment, only difference between the second embodiment and the first embodiment is described. The same reference numerals of the first embodiment are applied to the substantially same components in the second embodiment, and the overlapped description is omitted.

Referring to FIG. 3, the oil separator 12 is placed inside the rear housing 18 of the compressor 10. That is, the external refrigerant circuit 11 includes the condenser 13, the expansion valve 14 and the evaporator 15. The condenser 13 is connected to the expansion valve 14 by a piping. Also, the expansion valve 14 is connected to the evaporator 15 by a piping. The oil that is separated from the refrigerant gas by the separator 41 and that is reserved in the reservoir 43 is returned to the suction chamber 20 through the hole 46.

In the present embodiment, the second pressure monitoring point P2 is set in a muffler chamber 47 formed in the rear housing 18. The muffler chamber 47 interconnects the refrigerant gas passage 45 of the separator 41 with the discharge piping 24. Thus, the first pressure monitoring point P1 and the second pressure monitoring point P2 are set in the rear housing 18. Thereby, the first pressure detecting passage 55, which interconnects the first pressure monitoring point P1 with the control valve CV, and the second pressure detecting passage 56, which interconnects the second pressure monitoring point P2 with the control valve CV, are placed in the rear housing 18. Therefore, the size of the refrigerant circulation circuit as a whole becomes compact.

In the present invention, the following alternative embodiments are also practiced.

In the first and second embodiments, the first pressure monitoring point P1 is set in the discharge chamber 19. In alternative embodiments to the embodiments, however, the first pressure monitoring point P1 is set in the discharge passage 21 or in the refrigerant gas introducing portion 23. An object of the present invention is to sufficiently maintain controllability of the control valve CV by manifesting the differential pressure ΔP between the first pressure monitoring point P1 and the second pressure monitoring point P2. In the separator 41, when the oil is separated from the refrigerant gas by the separator 41, the pressure loss of the refrigerant gas manifests the differential pressure ΔP. Consequently, even if the first pressure monitoring point P1 is set in the discharge passage 21 or in the refrigerant gas introducing portion 23, in the present alternative embodiments, the similar effects of the first and second embodiments are substantially obtained.

In the above embodiments, the second pressure monitoring point P2 is set in the discharge piping 24 or in the muffler chamber 47. In alternative embodiments to the above embodiments, however, the second pressure monitoring point P2 is set in the refrigerant gas passage 45 of the separator 41. An object of the present invention is to sufficiently maintain controllability of the control valve CV by manifesting the differential pressure ΔP between the first pressure monitoring point P1 and the second pressure monitoring point P2. In the separator 41, when the oil is separated from the refrigerant gas by the separator 41, the pressure loss of the refrigerant gas manifests the differential pressure ΔP. Consequently, even if the second pressure monitoring point P2 is set in the refrigerant gas passage 45 of the separator 41, in the present alternative embodiments, the similar effects of the first and second embodiments are substantially obtained.

Therefore, the present examples and embodiments are to be considered as illustrative and not restrictive and the invention is not to be limited to the details given herein but may be modified within the scope of the appended claims.

What is claimed is:

1. A vehicle air conditioning apparatus including a refrigerant circulation circuit, the vehicle air conditioning apparatus comprising:
    a variable displacement type compressor located in the refrigerant circulation circuit for compressing refrigerant gas, displacement of the compressor being variable, the refrigerant gas including oil;
    a first pressure monitoring point also located in the refrigerant circulation circuit;
    a second pressure monitoring point also located in the refrigerant circulation circuit, the second pressure monitoring point being located more downstream than the first pressure monitoring point;
    a control valve located in the compressor for controlling the displacement based on differential pressure between the first and second pressure monitoring points; and
    an oil separator located between the first and second pressure monitoring points in the refrigerant circulation circuit in order to separate the oil from the compressed refrigerant gas, thereby the oil separator serving as means for manifesting the differential pressure.

2. The vehicle air conditioning apparatus according to claim 1, wherein the oil separator comprises:
    a separation chamber;
    a cylindrical separator placed in the separation chamber; and
    a reservoir juxtaposed with the separation chamber for reserving the oil that is separated from the refrigerant gas by the separator.

3. The vehicle air conditioning apparatus according to claim 2, wherein the compressor has a discharge chamber in which the first pressure monitoring point is located, the refrigerant circulation circuit including a condenser, the second pressure monitoring point being located between the oil separator and the condenser, the second pressure monitoring point being located more upstream than the condenser.

4. The vehicle air conditioning apparatus according to claim 3, wherein the oil separator is located outside the compressor.

5. The vehicle air conditioning apparatus according to claim 4, wherein the refrigerant circulation circuit includes a discharge piping between the oil separator and the condenser, the second pressure monitoring point being located in the discharge piping.

6. The vehicle air conditioning apparatus according to claim 3, wherein the oil separator is located inside the compressor.

7. The vehicle air conditioning apparatus according to claim 6, wherein the refrigerant circulation circuit includes a discharge piping between the oil separator and the condenser, the refrigerant circulation circuit including a muffler chamber that interconnects the oil separator with the discharge piping, the second pressure monitoring point being located in the muffler chamber.

* * * * *

UNITED STATES PATENT AND TRADEMARK OFFICE
CERTIFICATE OF CORRECTION

PATENT NO. : 7,207,185 B2  Page 1 of 1
APPLICATION NO. : 10/737941
DATED : April 24, 2007
INVENTOR(S) : Masaki Ota et al.

It is certified that error appears in the above-identified patent and that said Letters Patent is hereby corrected as shown below:

On the Title Page, item (73), please delete "General Electric Company, Schenectady, NY (US)" and insert -- Kabushiki Kaisha Toyota Jidoshokki, Kariya-shi (JP) --;

On the Title Page, item (74), please delete "Cantor Colburn LLP" and insert -- Morgan & Finnegan, L.L.P. --;

Column 1, line 39, please delete "returns to the compressor" and insert therefore -- returns the oil to the compressor --;

Column 1, line 48, please delete "exceeds effect of the improvement" and insert therefore -- exceeds the effect of the improvement --;

Column 2, line 41, please delete "side of drawing" and insert therefore -- side of the drawing --;

Column 6, line 15, please delete "of drawing" and insert therefore -- of the drawing --; and Column 6, line 16, please delete "only difference" and insert therefore -- only the difference --.

Signed and Sealed this

Thirteenth Day of October, 2009

David J. Kappos
*Director of the United States Patent and Trademark Office*